United States Patent
Müller et al.

(10) Patent No.: US 8,216,331 B2
(45) Date of Patent: Jul. 10, 2012

(54) PLATE-LIKE SEPARATOR FOR SEPARATING LIQUIDS FROM A GAS STREAM

(75) Inventors: Axel Müller, Freiburg (DE); Sven Rentschler, Sersheim (DE)

(73) Assignee: Rentschler Reven-Lüftungssysteme GmbH, Sersheim (DE)

(*) Notice: Subject to any disclaimer, the term of this patent is extended or adjusted under 35 U.S.C. 154(b) by 0 days.

(21) Appl. No.: 13/134,652

(22) Filed: Jun. 13, 2011

(65) Prior Publication Data

US 2011/0314777 A1    Dec. 29, 2011

(51) Int. Cl.
*B01D 45/00* (2006.01)

(52) U.S. Cl. ........ 55/440; 55/441; 55/442; 55/443; 55/444; 55/445; 55/464; 55/465; 55/434; 55/DIG. 5; 55/DIG. 37

(58) Field of Classification Search ........... 55/440–445, 55/464–465, 434, DIG. 5, DIG. 37
See application file for complete search history.

(56) References Cited

U.S. PATENT DOCUMENTS

| | | | | |
|---|---|---|---|---|
| 1,803,854 A * | 5/1931 | Kniskern | ........................ | 95/272 |
| 1,896,656 A * | 2/1933 | Anderson | ........................ | 29/460 |
| 3,227,600 A * | 1/1966 | Holland | ........................ | 428/116 |
| 3,405,511 A * | 10/1968 | Halter et al. | .................... | 55/440 |
| 3,520,116 A * | 7/1970 | Good | ........................ | 55/440 |
| 3,616,623 A * | 11/1971 | Reid | ........................ | 55/440 |
| 3,849,095 A * | 11/1974 | Regehr | ........................ | 55/394 |
| 3,870,488 A * | 3/1975 | Arndt et al. | .................... | 55/440 |
| 3,899,427 A * | 8/1975 | Connelly et al. | ............. | 210/521 |
| 3,910,782 A | 10/1975 | Struble et al. | .................. | 55/444 |
| 3,912,471 A * | 10/1975 | Cotton, Jr. | ...................... | 55/440 |
| 3,938,972 A * | 2/1976 | Sugimura | ........................ | 55/440 |
| 3,950,156 A * | 4/1976 | Kall | ........................ | 55/440 |
| 3,977,977 A * | 8/1976 | Kall | ........................ | 210/521 |
| 4,141,706 A * | 2/1979 | Regehr | ........................ | 55/437 |
| 4,175,935 A * | 11/1979 | Gutermuth et al. | .......... | 55/434.1 |
| 4,175,938 A * | 11/1979 | Regehr et al. | .................. | 55/440 |
| 4,189,990 A * | 2/1980 | Kittler | ........................ | 454/251 |
| 4,198,215 A * | 4/1980 | Regehr | ........................ | 55/440 |
| 4,204,847 A * | 5/1980 | Ko | ........................ | 96/356 |
| 4,225,188 A * | 9/1980 | McGuire et al. | ............. | 299/64 |
| 4,322,234 A * | 3/1982 | Mock | ........................ | 55/440 |
| 4,430,101 A * | 2/1984 | Sixsmith | ........................ | 55/440 |
| 4,545,792 A * | 10/1985 | Huttlin | ........................ | 96/320 |
| 4,557,740 A * | 12/1985 | Smith | ........................ | 55/440 |
| 4,581,051 A * | 4/1986 | Regehr et al. | .................. | 55/440 |

(Continued)

FOREIGN PATENT DOCUMENTS

DE    231 156    4/1923

(Continued)

*Primary Examiner* — Jason M Greene
*Assistant Examiner* — Dung H Bui (57) ABSTRACT

A separator is provided for separating liquids from a gas stream and has a plurality of separating profiles juxtaposed parallel to one another, each profile forming two curved deflection surfaces which lie opposite one another with the concave side laterally offset, wherein the deflection surfaces between them include a swirl chamber having an inlet gap and an outlet gap and terminate at their longitudinal edges in a projection that projects from the deflection surfaces and extends along the longitudinal edges. At least one of the projections has a first, substantially planar outer surface emanating from the deflection surface substantially transversely thereof and a second, substantially planar outer surface adjoining the first outer surface at an acute angle, so that the at least one projection forms a sharp edge that projects into the gas stream flowing along the deflection surfaces.

14 Claims, 5 Drawing Sheets

U.S. PATENT DOCUMENTS

| | | | | |
|---|---|---|---|---|
| 4,713,092 | A * | 12/1987 | Kikuchi et al. | 96/70 |
| 4,738,698 | A * | 4/1988 | Holcblat | 55/440 |
| 4,802,901 | A * | 2/1989 | Wurz et al. | 55/440 |
| 4,877,430 | A * | 10/1989 | Gutermuth | 55/434.4 |
| 5,104,431 | A * | 4/1992 | Fewel, Jr. | 55/440 |
| 5,203,894 | A * | 4/1993 | Chowaniec | 55/440 |
| 5,230,725 | A * | 7/1993 | Chowaniec | 55/440 |
| 5,268,011 | A * | 12/1993 | Wurz | 55/440 |
| 5,269,823 | A * | 12/1993 | Wurz | 55/440 |
| 5,302,174 | A | 4/1994 | Guetersloh | 55/444 |
| 5,318,609 | A * | 6/1994 | Kittler | 55/443 |
| 5,464,459 | A * | 11/1995 | VanBuskirk et al. | 96/356 |
| 5,514,193 | A * | 5/1996 | Schaal et al. | 96/356 |
| 5,653,786 | A * | 8/1997 | Taylor et al. | 95/268 |
| 5,972,062 | A * | 10/1999 | Zimmermann | 55/440 |
| 6,017,377 | A * | 1/2000 | Brown et al. | 55/435 |
| 6,083,302 | A * | 7/2000 | Bauver et al. | 95/216 |
| 6,770,121 | B1 * | 8/2004 | Sindel | 95/267 |
| 6,810,835 | B2 * | 11/2004 | Ishiguro et al. | 122/34 |
| 7,422,613 | B2 * | 9/2008 | Bockle et al. | 55/318 |
| 7,585,345 | B2 * | 9/2009 | Smasal et al. | 55/443 |
| 7,618,472 | B2 * | 11/2009 | Agnello et al. | 55/440 |
| 7,674,304 | B2 * | 3/2010 | Krell et al. | 55/440 |
| 7,686,862 | B1 * | 3/2010 | Daniel et al. | 55/440 |
| 7,905,937 | B2 * | 3/2011 | Nieuwoudt | 55/444 |
| 7,947,123 | B2 * | 5/2011 | Kwok et al. | 95/267 |
| 7,967,885 | B2 * | 6/2011 | Buzanowski | 55/440 |
| 8,105,022 | B2 * | 1/2012 | Ewida et al. | 415/169.2 |
| 2004/0007132 | A1 * | 1/2004 | Holmes et al. | 95/272 |
| 2005/0120688 | A1 * | 6/2005 | Shepherd | 55/440 |
| 2007/0137154 | A1 * | 6/2007 | Agnello et al. | 55/440 |
| 2009/0101014 | A1 * | 4/2009 | Baseotto | 95/272 |
| 2010/0199619 | A1 * | 8/2010 | Buzanowski | 55/443 |
| 2010/0326025 | A1 * | 12/2010 | Bratton | 55/440 |
| 2010/0326026 | A1 * | 12/2010 | Bratton | 55/440 |
| 2011/0011647 | A1 * | 1/2011 | Mantyniemi et al. | 175/220 |

FOREIGN PATENT DOCUMENTS

| | | |
|---|---|---|
| DE | 75 24 852 | 12/1975 |
| DE | 30 49 718 A1 | 3/1982 |
| DE | 87 00 012 U1 | 5/1987 |
| DE | 90 13 468 U1 | 4/1991 |
| DE | 41 31 988 C2 | 4/1993 |
| DE | 100 42 443 A1 | 4/2002 |
| DE | 20 2005 001 143 U1 | 5/2005 |
| EP | 0 281 981 | 9/1988 |
| EP | 281981 A2 * | 9/1988 |
| FR | 2 240 036 | 3/1975 |
| WO | WO 81/00218 | 2/1981 |
| WO | WO 88/04952 | 7/1988 |
| WO | WO 91/17813 | 11/1991 |
| WO | WO 9117813 A1 * | 11/1991 |
| WO | WO 94/13387 | 6/1994 |

* cited by examiner

PLATE-LIKE SEPARATOR FOR SEPARATING LIQUIDS FROM A GAS STREAM

FIELD OF THE INVENTION

The invention relates to a plate-like separator for separating liquids from a gas stream, in particular oil mist, wherein the stream approaches the separator transversely, comprising a plurality of separating profiles each forming two curved deflection surfaces, which lie opposite one another with the concave side laterally offset and along which in succession a gas stream to be cleaned flows, wherein the deflection surfaces between them include a swirl chamber having an inlet gap and an outlet gap and terminate at their longitudinal edges in a projection that projects from the deflection surfaces and extends along the longitudinal edges.

BACKGROUND OF THE INVENTION

Such a separator is for example described in DE 41 31 988 C2. It has emerged that with such a plate-like separator, which is composed of individual separating profiles with correspondingly curved deflection surfaces, it is possible to achieve a very good separation of liquid droplets and other suspended particles from a gas stream.

Proceeding from this background art the underlying object of the invention is further to improve the separating properties of such a separator.

SUMMARY OF THE INVENTION

In a separator of the initially described type this object is achieved according to the invention in that at least one of the projections has a first substantially planar outer surface emanating from the deflection surface substantially transversely thereof and a second, substantially planar outer surface adjoining the first outer surface at an acute angle so that the at least one projection forms a sharp edge that projects into the gas stream flowing along the deflection surfaces.

It has emerged that replacing a bead-like projection, such as is known in the background art, with a projection having two planar, mutually adjoining outer surfaces that include an acute angle leads to a marked improvement of the separating properties.

When it is stated that the first outer surface emanates from the deflection surface substantially transversely thereof, this is to be interpreted as an arrangement whereby the first outer surface and the deflection surface are perpendicular to one another, but it is also to be interpreted as an arrangement whereby the first outer surface emanates at an angle of between 60° and 120° from the deflection surface adjoining the at least one projection. The important point is that at the end of the deflection surface the first outer surface forms a baffle, which projects into the gas stream and terminates in a sharp edge, and is adjoined by the second outer surface, which extends approximately parallel to the deflection surface adjoining the at least one projection.

The size of the acute angle between the first outer surface and the second outer surface of the at least one projection may be between 30° and 60°, preferably in the region of ca. 45°.

According to a preferred development of the invention it may be provided that the at least one projection has at the outer side of the separating profile opposite to the deflection surface a substantially planar third outer surface that projects outwards substantially transversely of the deflection surface.

This third outer surface also emanates from the outer side at an angle of between 60° and 120°, preferably in the order of magnitude of 90°.

It is advantageous if the outer side of the separating profile in its region adjoining the longitudinal edges extends substantially parallel to the deflection surface of the separating profile, i.e. if the separating profile has the form of a curved plate, its inner side forming the deflection surface.

Particularly advantageous is a configuration, in which the first outer surface and the third outer surface lie in one plane.

According to a further preferred form of implementation it is provided that adjoining the second outer surface of the at least one projection is a fourth, substantially planar outer surface that extends substantially transversely of the second outer surface.

Here, by the expression "extending transversely" is meant an exactly perpendicular arrangement, however it may also be provided that the size of the angle between the second outer surface and the fourth outer surface lies between 75° and 105°.

In this case, it is advantageous if the edge between the second outer surface and the fourth outer surface is disposed substantially in an imaginary extension of the deflection surface beyond the at least one projection. Thus, the separating profile terminates in a point, upstream of which the projection is disposed in flow direction.

In particular it may be provided that the at least one projection has a triangular cross section, the base of which is formed by the first outer surface and the third outer surface and the sides of which are formed by the second outer surface and the fourth outer surface. This then gives the separating profile with the projection an arrow-shaped cross section.

Projections of the described type may be disposed on at least one longitudinal edge of the separating profiles, but it is particularly advantageous if such projections are disposed on all of the longitudinal edges of the separating profiles, i.e. if all of the separating profiles terminate at their free edge in a particularly arrow-shaped projection that extends in a strip-like manner over the entire length of the separating profile.

In a preferred form of implementation it is provided that the separating profiles bear two deflection surfaces, which are arranged in a mirror-inverted manner relative to one another and with their outer sides facing one another.

In this case, it is particularly advantageous if separating profiles having two deflection surfaces arranged in a mirror-inverted manner to one another are disposed rotated through in each case 180° and offset laterally and in inflow direction relative to one another. The plate-like separating element may then be assembled from separating profiles of a completely identical construction, which by virtue of their orientation and their position together with in each case adjacent separating profiles form the swirl chambers surrounded by the deflection surfaces.

The following description of preferred embodiments of the invention serves in connection with the drawings to provide a detailed explanation. The drawings show.

BRIEF DESCRIPTION OF THE DRAWINGS

DETAILED DESCRIPTION OF THE INVENTION

Figure 1:
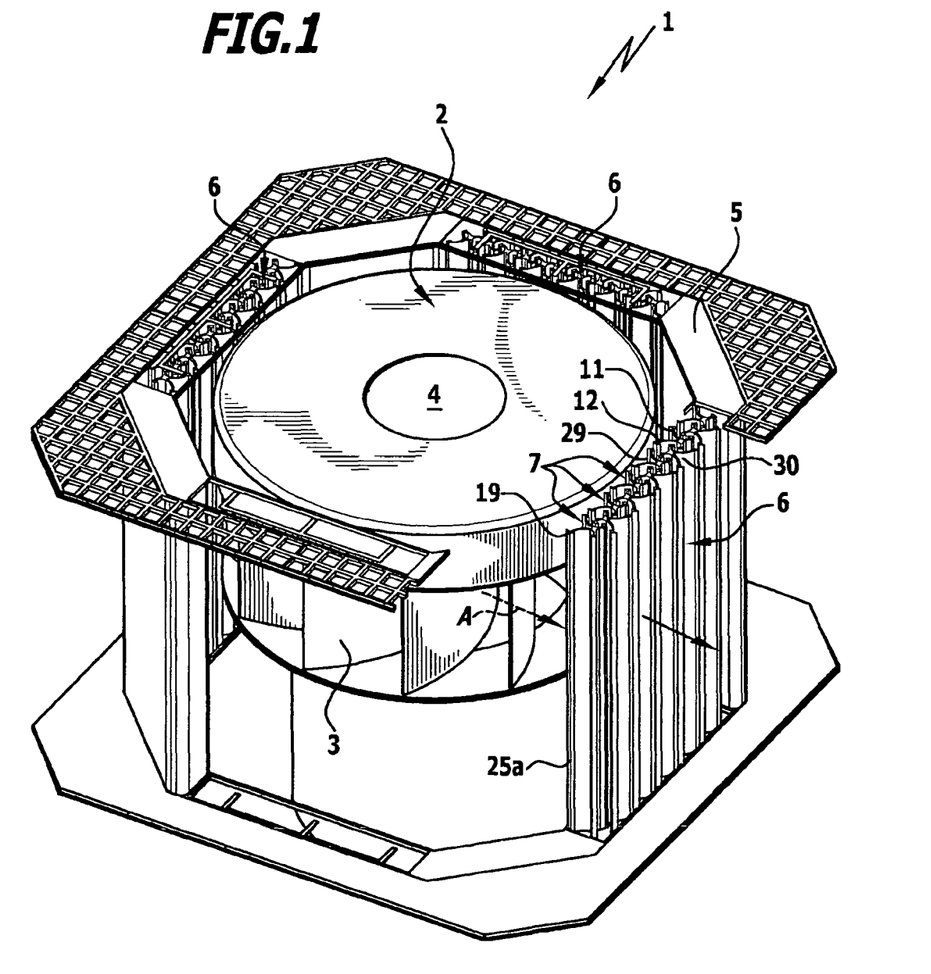
FIG. 1: a perspective view of a liquid separator provided with a pump and comprising plate-like separating elements composed of individual separating profiles.

The separating element 1 shown in FIG. 1 comprises a disk-shaped turbine wheel 2 having turbine blades 3, which is rotatable about a vertical axis by a drive not shown in the drawing and by means of which gas that is drawn as a result of the rotation in through a central opening 4 is deflected and conveyed in a radially outward direction. The turbine wheel 2 is disposed in a cage 5 having side walls that are permeable to the conveyed gas and form plate-like separators 6, which provide for the gas stream conveyed by the turbine wheel 2 a flow path, along which the gas stream is deflected and hence loses entrained liquid particles and other suspended particles, with the result that the gas stream exiting outwards from the separators 6 is cleaned.

The plate-like separators 6 substantially vertically surrounding the turbine wheel 2 are assembled from a plurality of juxtaposed separating profiles 7 extending parallel to one another, which are arranged alongside one another with clearance and between them form the flow path for the gas stream.

Figure 3:
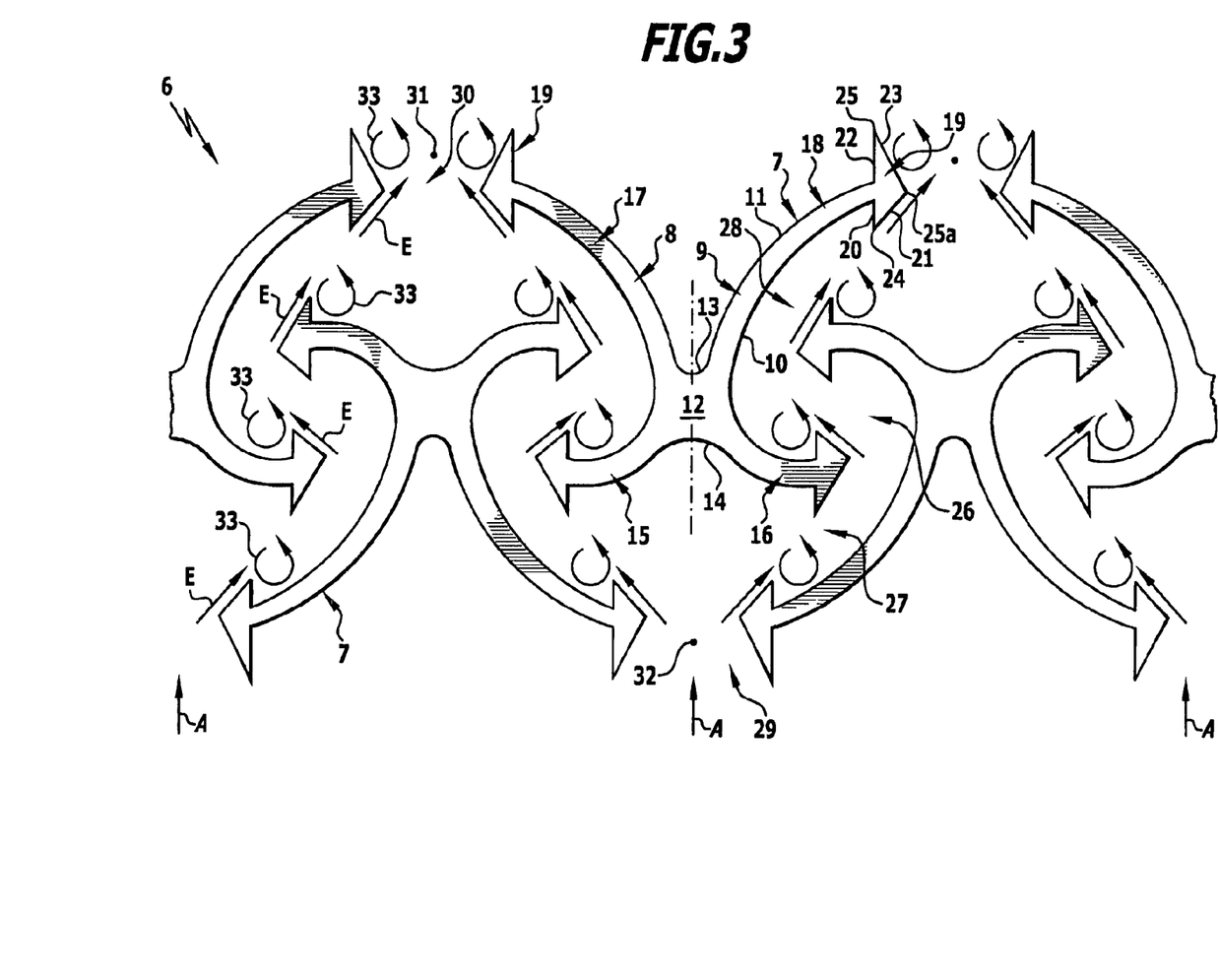
FIG. 3: a view similar to FIG. 2 with a plurality of juxtaposed separating profiles according to FIG. 2 and with an illustration of the flow paths arising between the separating profiles.

As is evident from the representation of FIG. 3, in the illustrated embodiment all of the separating profiles 7 that are used are of an identical construction in cross section, the separating profiles 7 being extruded profiles, which in their longitudinal direction have a constant cross section and which are arranged with their longitudinal axes parallel to one another in the separator 6.

Each separating profile 7 is formed mirror-symmetrically relative to a vertical centre plane (indicated by a dash-dot line in FIG. 3) and comprises on each side a bowl-shaped deflection part 8, 9, of which the concave inner side forms a deflection surface 10, while the convex outer side 11 extends substantially parallel to this deflection surface 10. The two deflection parts 8, 9 are connected by a bridge 12 to one another in such a way that the deflection surfaces 10 are directed away from one another. The curvature of the deflection surfaces 10 varies continuously in a plane extending transversely of the longitudinal direction of the separating profiles 7, i.e. it increases continuously from an edge of the deflection surface 10 to the opposite edge.

In the region of the bridge the outer sides 11 of the two deflection parts 8, 9 merge via an arc-shaped contour 13, 14 into one another, the overall result therefore being an approximately X-shaped cross section of a separating profile 7 comprising two short arms 15, 16 and two long arms 17, 18.

Figure 2:
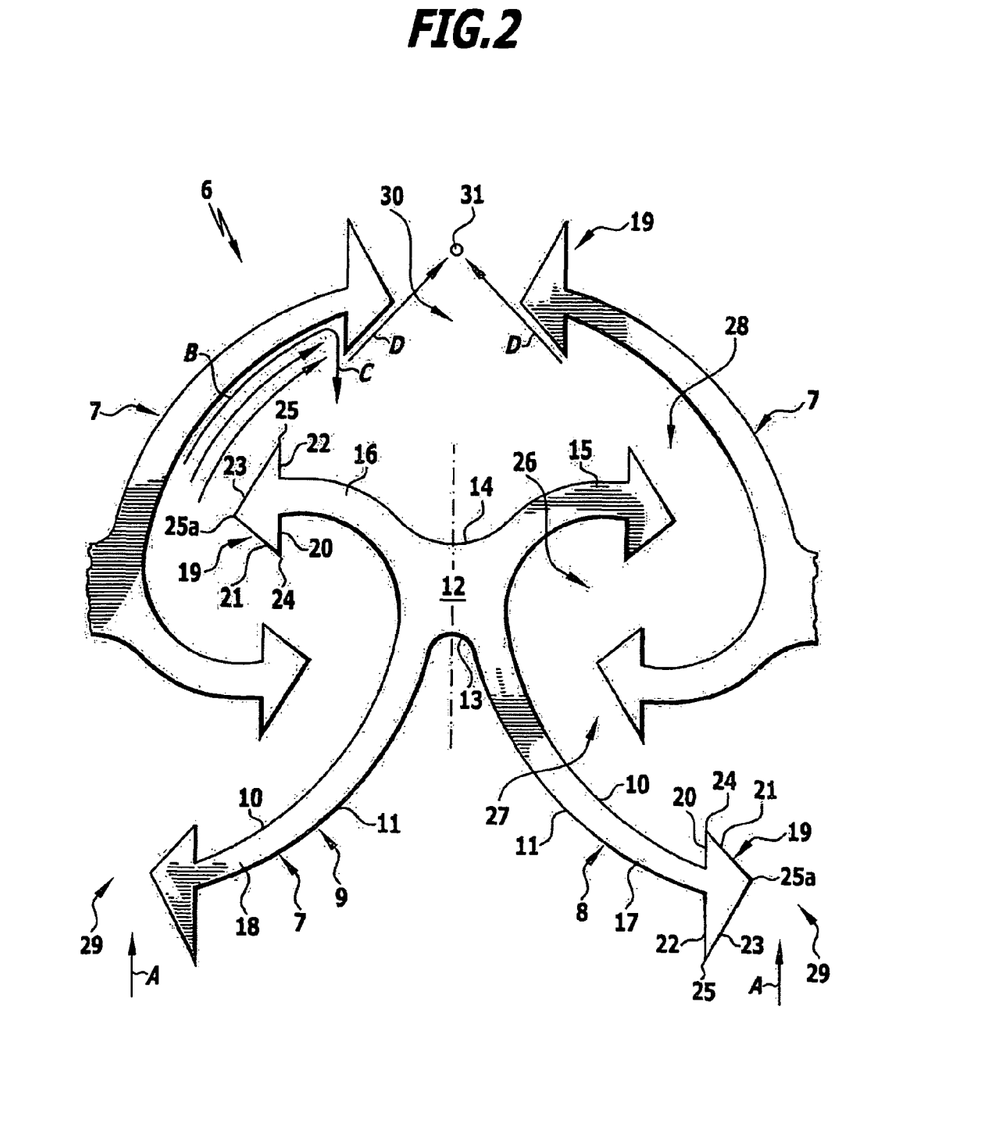
FIG. 2: a plan view of a detail of juxtaposed separating profiles having projections that are triangular in cross section on the free edges of the deflection surfaces formed by the separating profiles.

The deflection parts 8, 9 along their free edges carry projections 19, which in each case extend over the entire length of the separating profiles 7, have a constant cross section over this length and are triangular in cross section and which are laterally delimited by a planar first outer surface 20 that projects inwards from the deflection surface 10, a planar second outer surface 21 that with the first outer surface 20 includes an acute angle, a planar third outer surface 22 that is flush with the first outer surface 20 and projects outwards from the outer side 11 of the deflection part, and a planar fourth outer surface 23 that with the third outer surface 22 includes an acute angle and with the second outer surface 21 includes approximately a right angle. The first outer surface 20 and the second outer surface 21 between them include a sharp edge 24, the third outer surface 22 and the fourth outer surface 23 between them include a sharp outer edge 25, and the second outer surface 21 and the fourth outer surface 23 meet along a sharp edge 25a.

On the whole, therefore, the deflection part and the, in cross section, triangular projection 19 adjoining the end of the deflection part have an arrow-shaped cross-sectional shape, wherein the tip of this arrow is marked by the edge 25a, which is situated substantially on an imaginary extension of the deflection surface 10.

Such projections 19 are disposed on all of the edges of the separating profiles 7, with the arrow tips formed by the edges 25a being directed always away from the respective deflection surfaces 10.

The length of the first outer surface 20 and the third outer surface 22 in a direction transversely of the deflection surface 10 is approximately one to three times the thickness of the deflection parts, i.e. the distance between deflection surface 10 and outer side 11, and the plane, in which the first outer surface 20 and the third outer surface 22 lie, extends in relation to the deflection surface 10 either substantially at right angles, as is shown in the case of the short arms 15, 16, or at an angle of between 60° and 120°, as is shown in the case of the long arms 17, 18.

Separating profiles 7 of an identical construction are juxtaposed in such a way that adjacent separating profiles 7 are rotated in each case through 180° about their longitudinal axis and that adjacent separating profiles 7 are mutually offset transversely of the extent of the plate-like separators 6 in such a way that the bridges 12 of adjacent separating profiles 7 lie substantially side by side. Consequently, in each case the short arms 15, 16 of adjacent separating profiles 7 terminate approximately midway between the two outer edges of the deflection surfaces 10 of the adjacent separating profile 7, and the in each case mutually opposing short arms 15, 16 of adjacent separating profiles 7 surround a swirl chamber 26 having an inlet gap 27 and an outlet gap 28. In this case, the inlet gap 27 is formed by the outer side of a short arm 16 of one separating profile 7 and by the deflection surface 10 of the long arm 18 of the adjacent separating profile 7, while the outlet gap 28 is formed by the deflection surface 10 of the long arm 18 and the outer side 11 of the short arm 16 of the respective other separating profiles 7.

In the direction of the inlet gap 27 the curvature of the deflection surface 10 increases, i.e. the curvature is at its greatest in the region of the swirl chamber 26, and conversely the curvature of the deflection surface decreases in flow direction in the region of the outlet gap 28 from the swirl chamber 26.

The ends of the long arms 17, 18 of the separating profiles 7 of next-but-one separating profiles 7 lie opposite one another so that the, in cross section, arrow-shaped terminations of the long arms 17, 18 that are formed by the projections 19 are directed towards one another and between them form an entry opening 29 and, at the opposite side of the separator 6, an exit opening 30.

By virtue of the symmetrical construction comprising separating profiles 7 of an identical type that are arranged adjacent and rotated in each case through 180° relative to one another, the separator 6 formed by the separating profiles 7 may have an approach flow from both sides, the flow conditions in this case being identical. In the case of the embodiments shown in the drawings it is assumed that the approach flow occurs in the direction of the arrows A pointing from the bottom up. The gas directed towards the separator 6 in this case flows first through the entry openings 29, where it is divided into two partial streams that pass through the two inlet gaps 27 leading to the left and right into the two swirl chambers 26. From these swirl chambers 26 the gas flows out through the outlet gaps 28 and combines into one gas stream that leaves the separator 6 through the exit opening 30.

In this case, the gas upon leaving the swirl chambers 26 flows along the deflection surfaces 10, as is represented by the flow arrows B in FIG. 2. In this region the flow is extensively laminar but is disrupted by the sharp-edged strip that projects into the outlet gap 28 and is formed by the first outer surface 20 and the second outer surface 21 of the projection 19, with the result that the portion of the gas stream that lies immediately adjacent to the deflection surface 10 is deflected sharply inwards, as is indicated by the arrow C in FIG. 2. This sharp deflection of the flow leads to a so-called flow wall, which is oriented substantially in the direction of the first outer surface 20 and which collides with the portion of the gas stream that lies further away in an inward direction from the deflection surface 10. This collision leads both to an intensified separation and to an intensified agglomeration of small particles.

A similar collision of flows is produced in the region of the exit opening 30 by means of the converging second outer surfaces 21 of the mutually opposing projections 19, as is indicated by the flow arrows D in FIG. 2. The total air flow at the exit opening 30 is guided by means of the two converging outer surfaces 21 towards a single collision point 31, and this leads to very intensive agglomeration effects and separation effects.

A similar collision effect arises also in the region of the entry opening 29, as is evident from the representation of FIG. 3. By means of the fourth outer surfaces 23 of the projections 19 that converge in flow direction the gas flows are concentrated and guided towards a collision point 32, with the result that in this region an intensified separation and agglomeration likewise occurs.

It has further emerged that by virtue of the special shaping of the projections 19 so-called mini-cyclones are formed, i.e. small-area eddies 33 that form behind the projections 19 in each case at the downstream sharp edges thereof when a flow runs past and substantially parallel to the second outer surface 21 or the fourth outer surface 23 of the projection 19. In FIG. 3 such eddies 33 are diagrammatically represented at all of the projections 19, and the flows that produce these eddies 33 and extend substantially parallel to the second outer surfaces 21 and fourth outer surfaces 23 are denoted by arrows E. The production of these eddies occurs as a result of separation and breakaway of the flows running along the second outer surfaces and fourth outer surfaces, because such a flow is unable to follow the sharp deflections that are produced by the downstream edges of the projections. This leads to a zone of very low pressure at the downstream sharp-edged end of the second outer surface 21 and the fourth outer surface 23 and changes the flow to a cyclone flow with small eddies, which in turn promote the separation and agglomeration of particles entrained in the gas stream.

Figure 4:
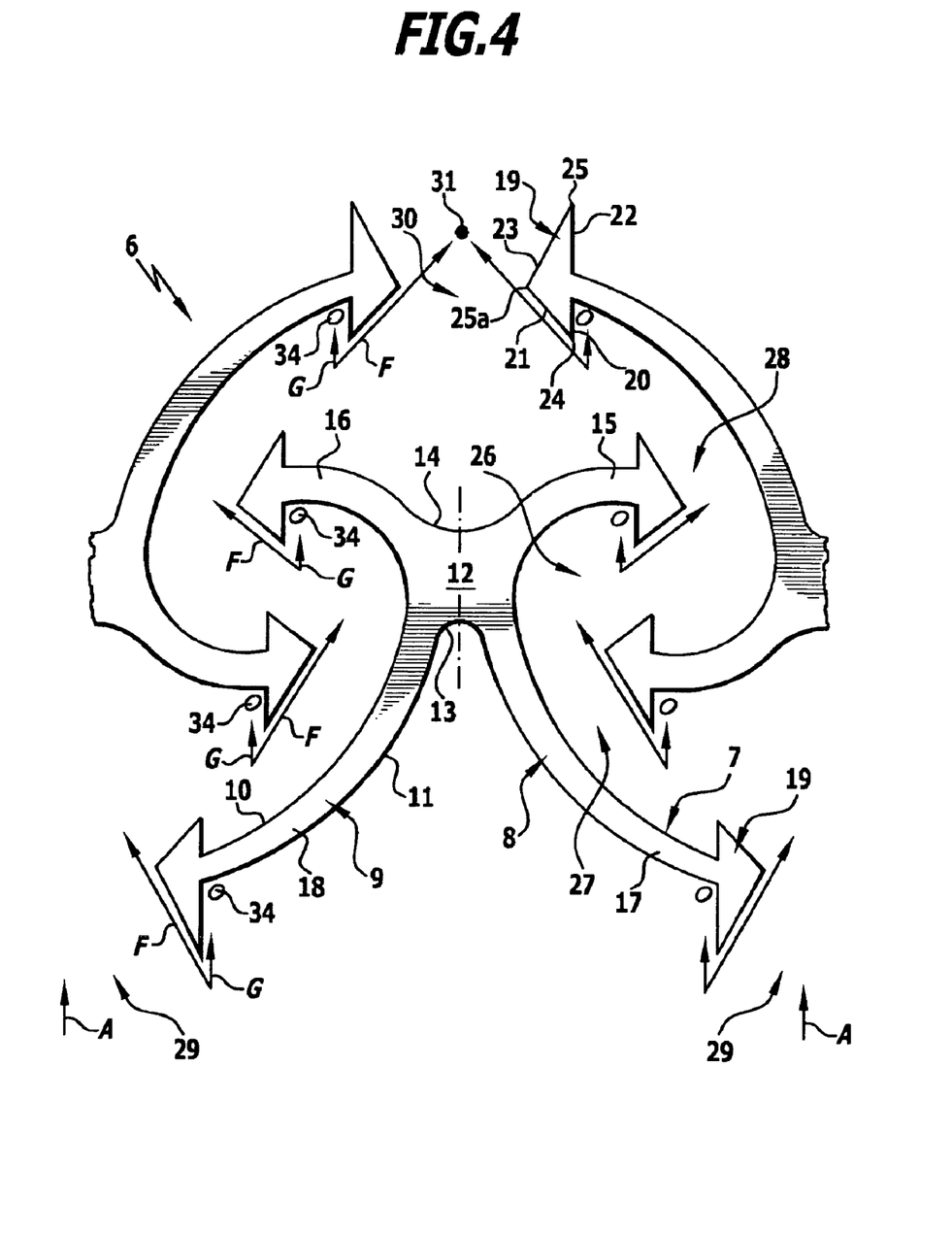
FIG. 4: a view similar to FIG. 2 with additional indications of flow paths in the region of the arrow-shaped projections

It has further emerged that the described shape of the projections 19 not only promotes the agglomeration and separation of particles entrained in the gas stream but also assists in carrying away the deposited particles. For cleaning of the gas stream it is not only essential that entrained particles are agglomerated and separated but it is also important that these are not entrained once more by the gas stream but may flow off downwards along the separating profiles 7 and hence be eliminated entirely from the gas stream. The sharp edges of the projections 19 prevent the droplets, once they have deposited on the wall, from being entrained over the edges, as may be the case with bead-like projections, with which the separated droplets are entrained along the bead surface by the gas stream. The acute angles between the deflection surface 10 and the outer surfaces of the projections that project from the deflection surface 10 and also from the outer side 11 ensure that droplets deposited there remain and flow off downwards under the effect of gravitational force. In FIG. 4 such separated droplets 34 are illustrated, which accumulate in the angles between deflection surface 10 and outer side 11, on the one hand, and the outer surfaces of the projection 19, on the other hand, and are then not entrained by the flows denoted by F in FIG. 4. In actual fact, a specific accumulation effect arises in these angular regions because from the flow denoted by F and running substantially along the second outer surface 21 and the fourth outer surface 23 a portion is split off by the sharp edge of the projection, this portion being represented by arrows G in FIG. 4. This portion keeps the separated droplets 34 in the acute angles, which because of the elongate shape of the separating profiles 7 act as drainage channels. In these drainage channels a higher pressure is produced by the gas stream G and ensures that the separated particles are able to move only from the top to the bottom and not horizontally in the direction of the air flow F.

Figure 5:
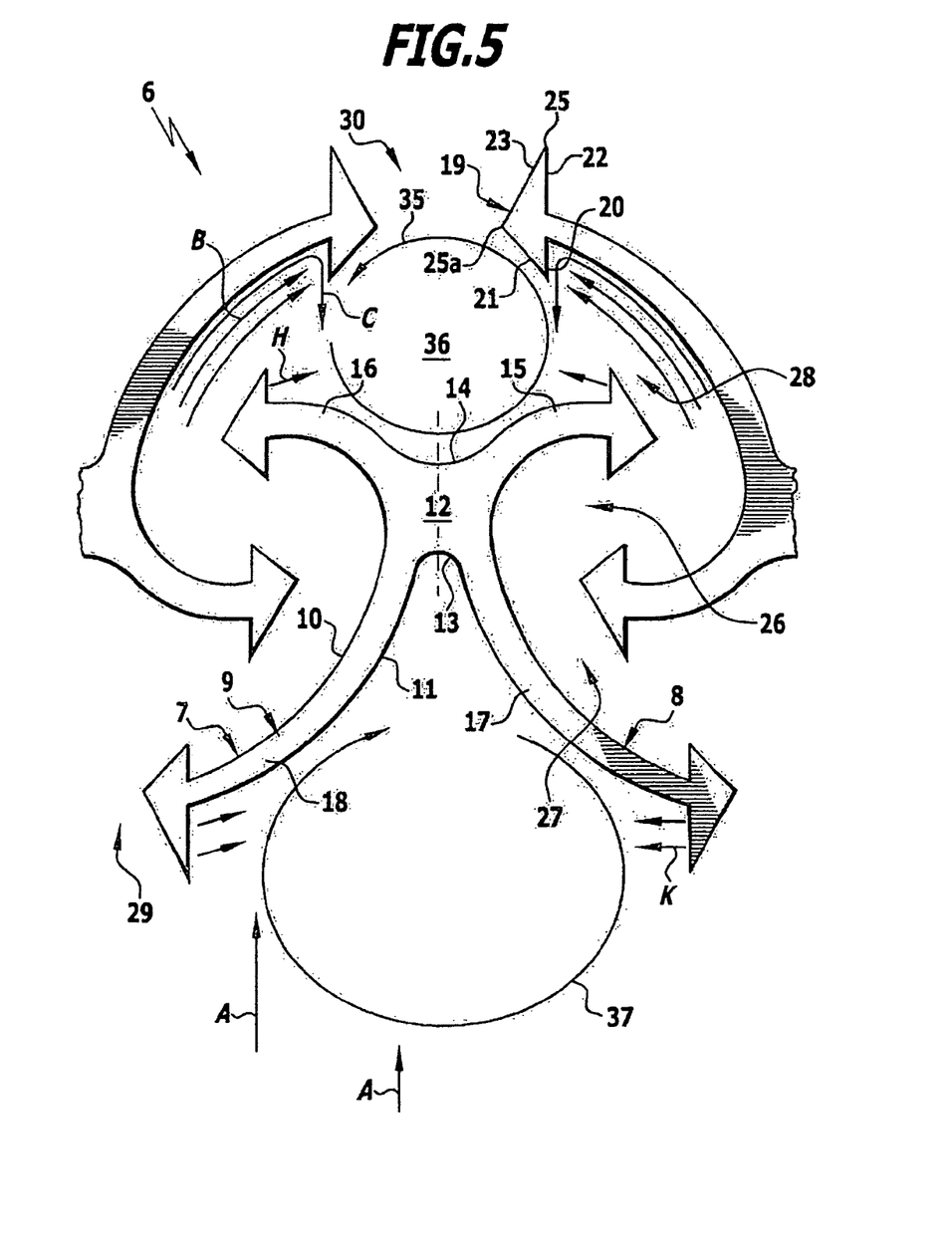
FIG. 5: a view similar to FIG. 2 with further illustrations of flow paths that arise during flow through the separating element.

As described with reference to FIG. 2, an inwardly directed flow wall, which is denoted in FIGS. 2 and 5 by the letter C, is formed in the outlet gap 28 by the first outer surface 20 of the projection 19 and this flow wall is deflected at the outer side 11 of the short arms 15, 16 of the adjacent separating profile 7 in such a way that there is disposed upstream of the exit opening 30 a large cyclone field 35, which rotates with a high intensity and leads likewise to a further improvement of the particle separation. The, in cross section, triangular projections 19 assist this cyclone formation because they delimit the chamber 36 disposed upstream of the exit opening 30 and hence lead to a blocking effect, with gas flows that are directed towards the third outer surfaces 22 of the projections 19 being deflected and reflected at these third outer surfaces 22, so that the corresponding gas portions in turn assist the formation of the cyclone field 35, this being made clear by the flow arrows denoted by the letter H in FIG. 5.

A similar effect is produced by the approach flow of the gas stream in the region between two entry openings 29. In this region for similar reasons a large cyclone field 37 develops between the outwardly curved long arms 17, 19 and is assisted likewise by gas stream fractions (arrow K) that arise as a result of gas stream portions being deflected by third outer surfaces 22.

The described influences upon the flow conditions arise as a result of the special shaping of the projections 19 that are disposed on the edges and extend along the edges, so that by virtue of this shaping a quite considerable improvement of the separating quality of the separator 6 as a whole may be achieved.

The invention claimed is:

1. Separator for separating liquids from a gas stream, wherein the stream approaches the separator transversely, comprising a plurality of separating profiles juxtaposed parallel to one another and transversely of the flow direction of the gas stream and each forming two curved deflection surfaces, which lie opposite one another with the concave side laterally offset and along which in succession a gas stream to be cleaned flows, wherein the deflection surfaces between them include a swirl chamber having an inlet gap and an outlet gap and terminate at their longitudinal edges in a projection that projects from the deflection surfaces and extends along the longitudinal edges, wherein at least one of the projections has a first, substantially planar outer surface emanating from the deflection surface substantially transversely thereof and a second, substantially planar outer surface adjoining the first outer surface at an acute angle so that the at least one projection forms a sharp edge that projects into the gas stream flowing along the deflection surfaces.

2. Separator according to claim 1, wherein the first outer surface emanates at an angle of between 60° and 120° from the deflection surface adjoining the at least one projection.

3. Separator according to claim 1, wherein the size of the acute angle between the first outer surface and the second outer surface of the at least one projection is between 30° and 60°.

4. Separator according to claim 1, wherein the at least one projection has at the outer side of the separating profile opposite to the deflection surface a substantially planar third outer surface that projects outwards substantially transversely of the deflection surface.

5. Separator according to claim 4, wherein the third outer surface emanates at an angle of between 60° and 120° from the outer side of the separating profile.

6. Separator according to claim 5, wherein the outer side of the separating profile in its region adjoining the longitudinal edges extends substantially parallel to the deflection surface of the separating profile.

7. Separator according to claim 4, wherein the first outer surface and the third outer surface lie in one plane.

8. Separator according to claim 1, wherein there adjoins the second outer surface of the at least one projection a fourth, substantially planar outer surface that extends substantially transversely of the second outer surface.

9. Separator according to claim 8, wherein the size of the angle between the second outer surface and the fourth outer surface is between 75° and 105°.

10. Separator according to claim 8, wherein the edge between the second outer surface and the fourth outer surface is disposed substantially in an imaginary extension of the deflection surface beyond the at least one projection.

11. Separator according to claim 8, wherein the at least one projection has a triangular cross section, the base of which is formed by the first outer surface and the third outer surface and the lateral sides of which are formed by the second outer surface and the fourth outer surface.

12. Separator according to claim 1, wherein on all of the longitudinal edges of the deflection surfaces a projection is disposed.

13. Separator according to claim 1, wherein the separating profiles carry two deflection surfaces, which are arranged in a mirror-inverted manner relative to one another and with their outer sides facing one another.

14. Separator according to claim 13, wherein separating profiles comprising two deflection surfaces arranged in a mirror-inverted manner relative to one another are disposed in each case rotated through 180° and offset laterally and in inflow direction relative to one another.

* * * * *